UNITED STATES PATENT OFFICE.

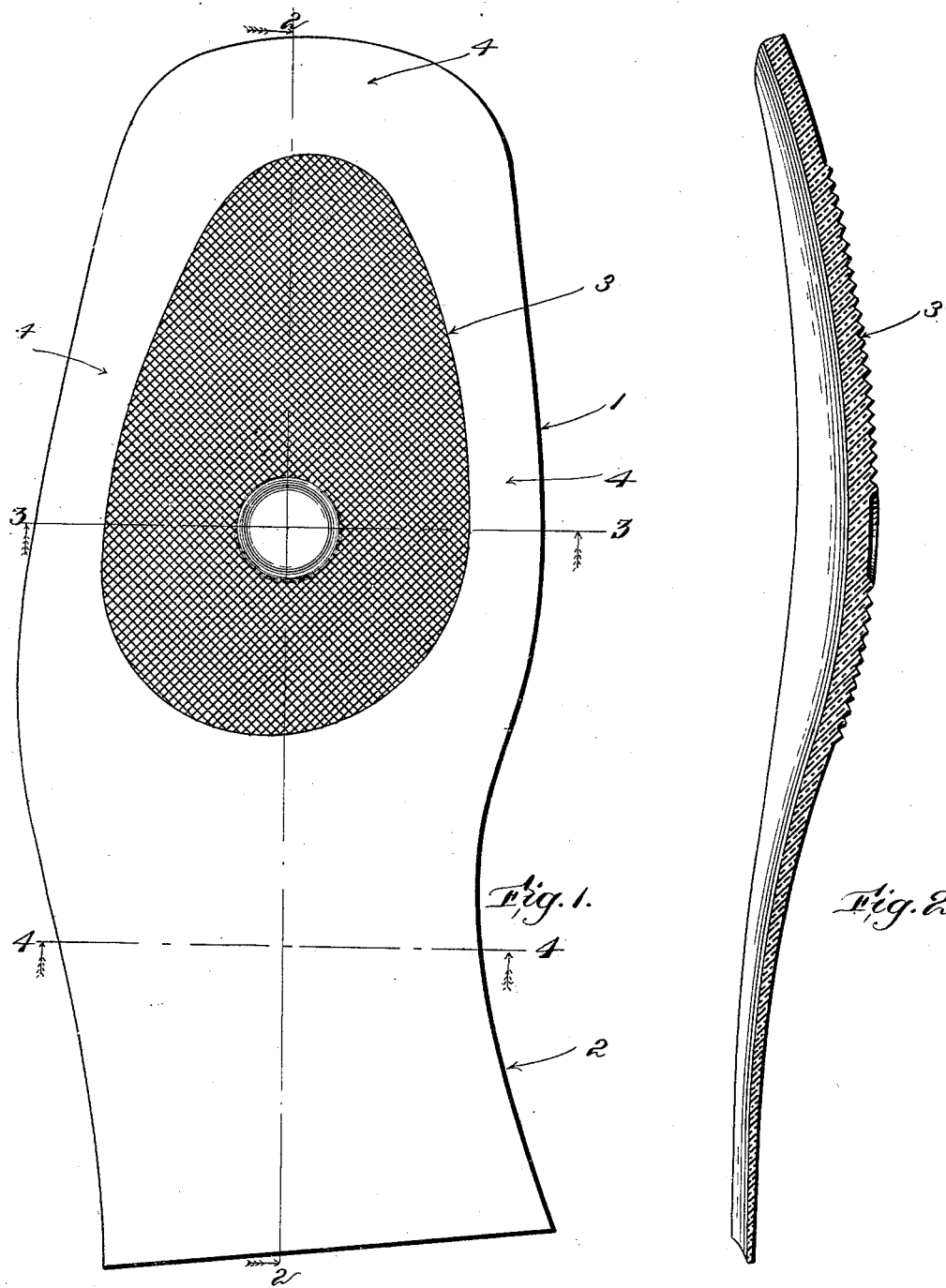

FRANK W. WHITCHER, OF BOSTON, MASSACHUSETTS, ASSIGNOR TO FRANK W. WHITCHER & CO., OF SAME PLACE.

RUBBER SOLE.

SPECIFICATION forming part of Letters Patent No. 657,277, dated September 4, 1900.

Application filed November 28, 1898. Serial No. 697,620. (No model.)

*To all whom it may concern:*

Be it known that I, FRANK W. WHITCHER, a citizen of the United States, residing at Boston, in the county of Suffolk and State of Massachusetts, have invented certain new and useful Improvements in Rubber Soles for Boots or Shoes, of which the following is a specification, reference being had therein to the accompanying drawings.

After the purchase of a pair of boots or shoes or even after the same have been in use for a given length of time the wearer thereof sometimes desires to have rubber tap-soles applied thereto, because of a preference for the softness, elasticity, and waterproof qualities of such soles. The said rubber tap-soles commonly are applied in practice to the exterior of the usual leather soles, ordinarily being cemented to the outer surfaces of the said leather soles.

The rubber tap-soles heretofore provided for application to the exterior surfaces of the leather soles of boots and shoes have possessed certain drawbacks, which latter are incident to the fact that such rubber tap-soles have been formed of flat sheets of rubber, the latter being cut, died out, or molded to the required contour. The leather sole of an ordinary boot or shoe is rounded or curved both longitudinally and transversely, the degree of rounding or curvature sometimes being quite pronounced in both directions. A flat rubber tap-sole obviously will not lie in perfect contact with the outer rounded or curved surface of a leather sole. It requires to be strained and manipulated in order to make the surface thereof correspond with the surface of the leather sole. When cement is applied and it is undertaken to press all portions of the flat rubber tap-sole into contact with the rounded or curved surface of the leather sole, there is a tendency on the part of the edge portions of the rubber tap-sole to stand out in places at a distance from the said rounded or curved surface. It is very difficult to hold all portions of the rubber tap-sole down against the leather sole, and the operation of smoothing down one obstinate portion tends to cause an uprising of an adjoining portion which previously was temporarily united to the leather sole. There is a tendency on the part of the rubber tap-sole to form cockles or crinkles in places around the edges thereof as a result of the endeavor to smooth down and work out the bulging and bowed-out places. Great difficulty, therefore, is experienced in seeking to cause the flat rubber tap-sole to fit to the rounded or curved surface of the leather sole of a boot or shoe, and a considerable amount of skill is required. Even after a satisfactory union apparently has been effected the rubber tap-sole often separates after a little wear from the leather sole at the places where bows, bulges, cockles, or crinkles showed themselves, there being an inherent tendency to separate on account of the straining and forcing of the rubber tap-sole in the effort to cause it to lie and adhere properly to the leather sole.

The main object of the invention is to provide rubber tap-soles which shall be adapted to be applied to the exterior of the usual leather soles of ordinary boots and shoes and which especially shall be free from the drawbacks that already have been indicated herein as incident to the flat rubber tap-soles heretofore in use.

Other objects of the invention are disclosed in the course of the following description.

The invention consists in the improved rubber tap-sole possessing the characteristics which will be described now with reference to the accompanying drawings, in which latter I have illustrated an embodiment of the invention.

Figure 1 of the drawings shows the under or wear surface of a rubber tap-sole embodying my present invention. Fig. 2 is a view of the said tap-sole in longitudinal section along the dotted line 2 2 of Fig. 1 looking in the direction that is indicated by the arrows near the ends of such line. Fig. 3 is a view in transverse section along the dotted line 3 3 in Fig. 1 looking in the direction that is indicated by the arrows near the ends of such line. Fig. 4 is a view in transverse section along the dotted line 4 4 in Fig. 1 looking in the direction that is indicated by the arrows near the ends of such line.

In the drawings, 1 designates the tread portion of the rubber tap-sole that is shown in the drawings. It is intended that the said tap-sole shall cover both the tread and shank of the leather sole of the shoe to which it is applied. Consequently the said tap-sole is formed with a shank portion 2.

3 is a patch or field of roughened or corrugated surface on the under side of the tread portion 1 of the rubber tap-sole for the purpose of giving a better hold upon the surface which is trodden upon, as usual, this patch or field being of a shape or contour which corresponds substantially with the usual shape or contour of the tread of the sole of a shoe.

4 is a plain margin, which is formed outside or around the patch or field 3 for the purpose of furnishing a neater and more pleasing finish at the edge of the shoe-sole than would be secured if the corrugations or roughenings should extend clear to the said edge and be visible thereat. With the object in view of rendering it possible to apply the rubber tap-sole to any one of a great variety of sizes and shapes of shoes the plain margin 4 is made of considerable width, it being intended that such margin shall be trimmed or pared down to fit the dimensions and contour of the leather sole to which it is applied in practice.

Preferably the shank portion 2 of the rubber tap-sole is of decreased thickness, which secures a more pleasing and satisfactory effect after the application of the rubber tap-sole to a boot or shoe. One characteristic of the said shank portion is that it is made of sufficient length to afford an excess over the usual requirements and also is made quite wide in comparison with the usual leather shank of a boot or shoe, with the special object in view of permitting the rubber tap-sole to be swung or adjusted transversely to a considerable extent in the undertaking to apply the patch or field of corrugations or roughening properly with relation to the tread of the boot or shoe. This provision accommodates quite a range of variations in the transverse curvature, &c., of leather soles. Some shoes are made on lasts which are almost straight lengthwise thereof, while others are made on lasts which are curved considerably in order to conform more or less to the natural shape of the human foot. Thus in some cases the shank of the sole and the tread of the latter are more or less perfectly in line with each other, while in other cases they are bent out of straight line and stand more or less at an angle. Variations on this order are all provided for by the liberal width of the shank taken in connection with the wide plain margin of the tread portion of the rubber tap-sole. Thereby the rubber sole and the leather sole to which it is applied are enabled to be so adjusted and set with respect to each other as to bring the patch or field 3 of corrugations or roughenings in proper position with relation to the tread of the leather sole without depriving the shank of the shoe of the desired rubber covering either in whole or in part. Hence whatever the shape may be of the sole of the shoe to which my rubber tap-sole is to be fitted the latter is adapted to be applied thereto readily and conveniently in a manner completely covering both the tread and the shank of the shoe.

In the attainment of the main object of my invention—namely, that of enabling the rubber tap-sole to be fitted perfectly to the exterior surface of the ordinary leather sole of a boot or shoe and of obviating the drawbacks which are incident to the employment of a flat rubber tap-sole, as heretofore—I proceed as follows: I form the improved rubber tap-sole slightly dishing, it being a little concave on its upper surface, which is to be applied to the exterior surface of a leather sole, and a little convex on its wearing-surface. The curvature of the surface of the rubber tap-sole extends both longitudinally and transversely, as indicated in the drawings. The dishing or curvature is slight or gradual and practically uniform over the entire area of the tread portion of the tap-sole. It is exaggerated somewhat in the drawings, with the object in view of rendering the same more clearly apparent.

It will be perceived that the curvature or dishing of the rubber tap-sole is such as not to interfere in the least with the making of any required shift or adjustment of the rubber tap-sole with relation to the leather sole to which it is sought to apply the same. No matter in what position, within practical and obvious limits determined by the proportions of the rubber tap-sole, the latter is applied to the leather sole, there will be the same perfect fit of the rubber tap-sole to the leather sole and a complete absence of bows or bulges, cockles or crinkles when the rubber tap-sole is secured to the leather sole. The operation of securing the rubber tap-sole to a leather sole is very much simplified and facilitated. The rubber tap-sole remains more permanently attached over its entire area, it having no special tendency to separate at any particular places, and its durability is greatly enhanced.

I claim as my invention—

1. The improved rubber tap-sole for application to the leather sole of an ordinary boot or shoe, slightly dished or curved and thereby adapted to be fitted smoothly and without cockles or crinkles to the surface of the said leather sole, and having the patch or field of corrugations or roughenings, and the plain trimming-margin around and outside of said patch or field, substantially as described.

2. The improved rubber tap-sole for application to the leather sole of an ordinary boot or shoe, slightly dished or curved and thereby adapted to be fitted smoothly and without cockles or crinkles to the surface of said leather sole, having the wide shank portion, the patch or field of corrugations or roughenings, and the plain trimming-margin around and outside of said patch or field, substantially as described.

In testimony whereof I affix my signature in presence of two witnesses.

FRANK W. WHITCHER.

Witnesses:
CHAS. F. RANDALL,
LEPINE HALL RICE.